HAVEMEYER & SCHNITZSPAN.

Sugar Mold Carriage.

No. 1,542. Reissued Sept. 22, 1863.

Witnesses:
James Laird
E. M. Hodgdon

Inventor:
Thos. A. Havemeyer
Henry Schnitzspan

N. PETERS, Photo-Lithographer, Washington, D. C.

UNITED STATES PATENT OFFICE.

THEO. A. HAVEMEYER, OF NEW YORK, N. Y., ASSIGNEE OF T. A. HAVEMEYER AND HENRY SCHNITZPAN, OF SAME PLACE.

IMPROVEMENT IN SUGAR-MOLD CARRIAGES.

Specification forming part of Letters Patent No. 34,683, dated March 18, 1862; Reissue No. 1,542, dated September 22, 1863.

*To all whom it may concern:*

Be it known that T. A. HAVEMEYER and HENRY SCHNITZPAN, of the city, county, and State of New York, did invent a new and Improved Sugar-Mold Carriage, for which Letters Patent were granted to them bearing date March 18, 1862; and be it further known that by virtue of an assignment duly recorded in the Patent Office, I, T. A. HAVEMEYER, became vested in all the right, title, and interest in said Letters Patent, and surrendered the same and obtained a reissue on the 22d day of September, 1863; and, for the purpose of obtaining an amendment of the reissued Letters Patent, I do hereby declare that the following is a full, clear, and exact description of the same, reference being had to the accompanying drawings, making a part of this specification, in which—

Figure 1:
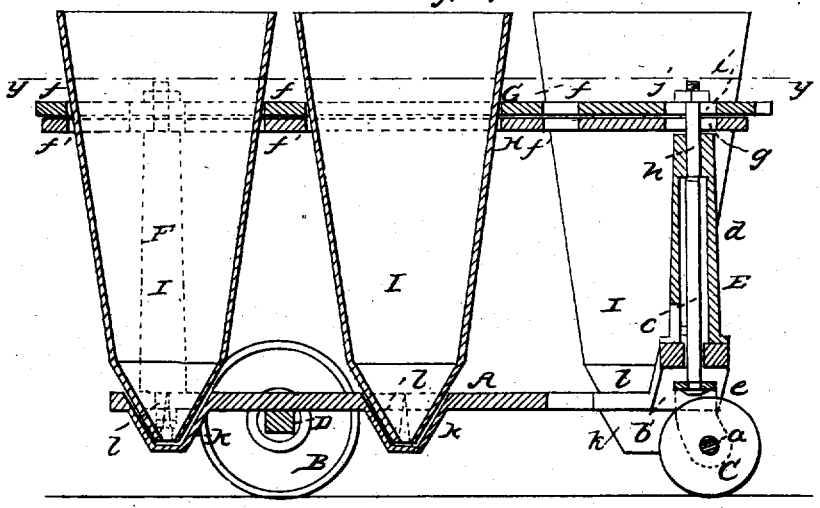
Figure 2:
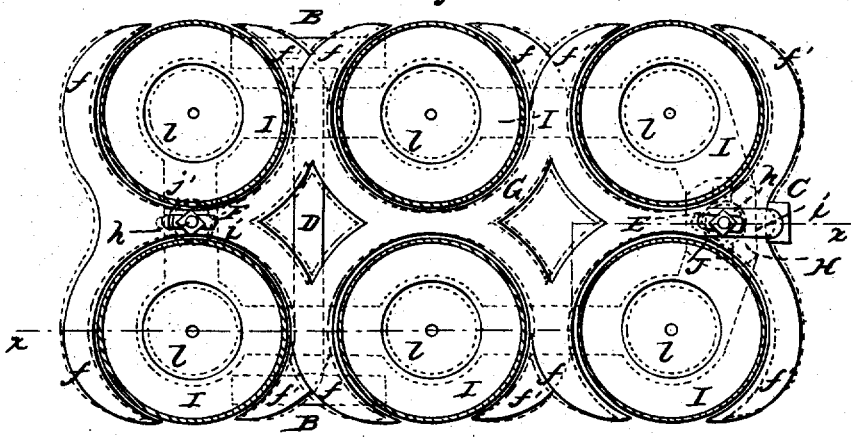

Figure 1 is a side sectional view of the invention, taken in the line *x x*, Fig. 2; Fig. 2, a horizontal section of the same, taken in the line *y y*, Fig. 1.

Similar letters of reference indicate corresponding parts in the two figures.

This invention relates to an improved carriage for conveying sugar-molds from the coolers in the refinery to the apartment in which they are placed to admit of the draining operation being gone through with.

The object of the invention is to obtain a carriage for the purpose specified which will admit of being adjusted to suit molds of different sizes, and also be capable of being moved about with greater facility than those previously constructed.

The invention consists in supporting or retaining the upper parts of the molds by means of adjustable arms attached to the carriage, and arranged in pairs in such a manner as to be capable of being adjusted toward and from each other, and also in using, in connection with said adjustable plates, a fixed frame or plate provided with inverted conical recesses to receive the tips of the molds.

The invention further consists in a novel arrangement of a caster-wheel which supports the front part of the carriage, all arranged so as to effect the desired end.

To enable those skilled in the art to fully understand and construct the invention, I will proceed to describe it.

A represents a horizontal frame or plate, which may be of any desired size, and which is mounted on three wheels, B B C. The wheels B B support the back part of the frame A, and they may turn loosely on a fixed axle, D, or be rigidly attached to their axle and the latter allowed to turn. The wheel C supports the front part of the frame A, and is what is commonly termed a "caster-wheel." This wheel C has its axle *a* fitted, as usual, in a fork, *b*, at the lower end of a vertical arbor, *c*. The arbor *c* is fitted loosely in a vertical post, E, the lower end of which is permanently attached to the front end of the frame A, the upper end of arbor *c* bearing against the upper end of the opening *d* in the post. The arbor *c* is allowed to turn freely in the post E, and the front end or part of the frame A is bent or curved upward to form a recess, as shown at *e*, so as to admit of a large-sized caster-wheel being used, the upper part of the caster-wheel fitting in the recess *e*, and the latter being made sufficiently wide to admit of said wheel turning in it. The draft-pole is attached to the fork *b* of the arbor *c*, or to the axle *a* of the wheel C.

To the back part of the frame A there is attached, in a central line with the post E, a post, F. The two posts E F are of equal height, and they support two plates, G H, which are placed one over the other and are parallel with the frame A. The plates G H are provided, respectively, at each side with curved arms *f f'*, of semicircular form, the arms *f* of the upper plate, G, having a reverse position to the arms *f'* of the lower plate, H, as shown clearly in Fig. 2. The lower plate has two oblong slots, *g g*, made longitudinally in it, one near each end in a central line, and the upper ends of the posts have vertical rods *h h*, fitted and secured in them, which rods pass through the slots *g g*, the plate H resting on the tops of the posts E F. The plate G has similar slots, *i i*, made in it, through which the rods *h h* pass, and the latter have screw-threads cut on them to receive nuts *j j*. By this arrangement it will be seen that the two plates G H are allowed a certain degree of adjustment longitudinally, corresponding to the length of the slots *g g i i*, less the thickness of the rods *h h*, which pass through them; and it will also be seen that said plates may be secured at any desired point within the scope or length of their movement by screwing down the nuts *j j* on the plate G.

The frame A is provided with a series of recesses, *k*, which are of inverted conical form, corresponding to that of the tips *l* of the molds I, as shown in Fig. 1. The molds I are of the usual form, and they are made of different sizes, so as to form sugar loaves of the different sizes and weights required. The molds I are fitted in the carriage as follows: The orifices at the tips of the molds are filled or stopped with plugs, (shown in red, Fig. 1,) and the tips *l* of the molds are fitted in the recesses *k* of the frame A, and the upper parts of the molds are placed between the arms *f f'* of the plates G H, and the latter are then adjusted or moved longitudinally, so that the arms *f f'* will snugly grasp the upper part of the molds, forming nearly a circle around each mold, the plates being then firmly secured in position by screwing down the nuts *j j*. (See Fig. 2.) Thus it will be seen that molds of different sizes may be firmly secured in the carriage by simply adjusting the plates G H. There will be no shaking of the molds whatever their dimensions may be, and they may be secured in the carriage and released therefrom with the greatest facility.

By having the front end or part of the frame A bent or curved, so as to form the recess *e*, as previously described, a large-sized caster-wheel, C, is obtained, and allowed to be placed underneath the frame A, so that its arbor *c* may be fitted in the post E without having the frame A unduly elevated, and by having the arbor *c* of said wheel fitted in the hollow post E the former does not monopolize any room, and the caster-wheel is allowed to turn freely, as it can be kept well lubricated and free from dust. A large caster-wheel does not allow obstructions which it may meet or come in contact with to offer resistance to the movement of the carriage as a small one.

Having thus described the invention, what I claim as new, and desire to secure by Letters Patent, is—

1. The employment or use, in a sugar-mold carriage, of a series of arms, *f f'*, arranged or applied in pairs in such a manner as to be capable of being adjusted toward and from each other to grasp and retain molds of different sizes, substantially as set forth.

2. In combination with the adjustable plates G H, the frame A, provided with recesses *k*, to receive the tips *l* of the molds, as specified.

3. Providing the frame A with a recess, *e*, at its front part or end, substantially as shown, to receive the caster-wheel C when said frame-recess and caster-wheel are used in combination with or applied to a sugar-mold carriage, for the purpose herein specified.

4. The hollow post E, arranged to receive the arbor *c* of the caster-wheel C, and attached to the frame A to support the front end of the plates G H, substantially as set forth.

5. The combination, construction, and arrangement of the parts herein shown and described, to operate as and for the purpose specified.

THEO. A. HAVEMEYER.

Witnesses:

THOS. S. J. DOUGLAS,

MONTGOMERY M. LIVINGSTON.